No. 780,573. PATENTED JAN. 24, 1905.
J. M. NASH.
WOODWORKING MACHINE.
APPLICATION FILED MAR. 9, 1903.
10 SHEETS—SHEET 1.

Witnesses:
Geo. W. Young
N. B. Oliphant

Inventor:
John M. Nash
By H. G. Underwood
Attorney.

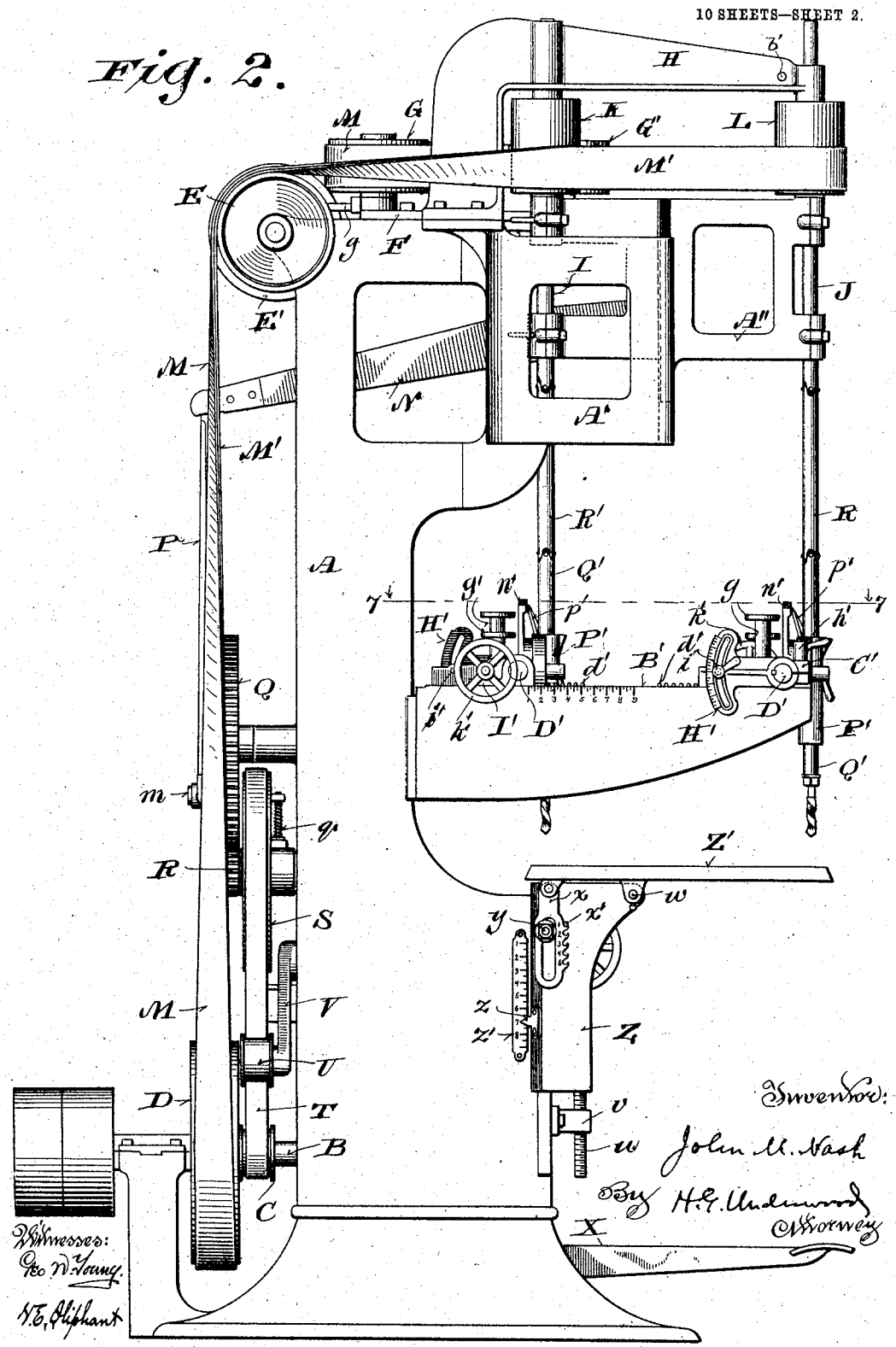

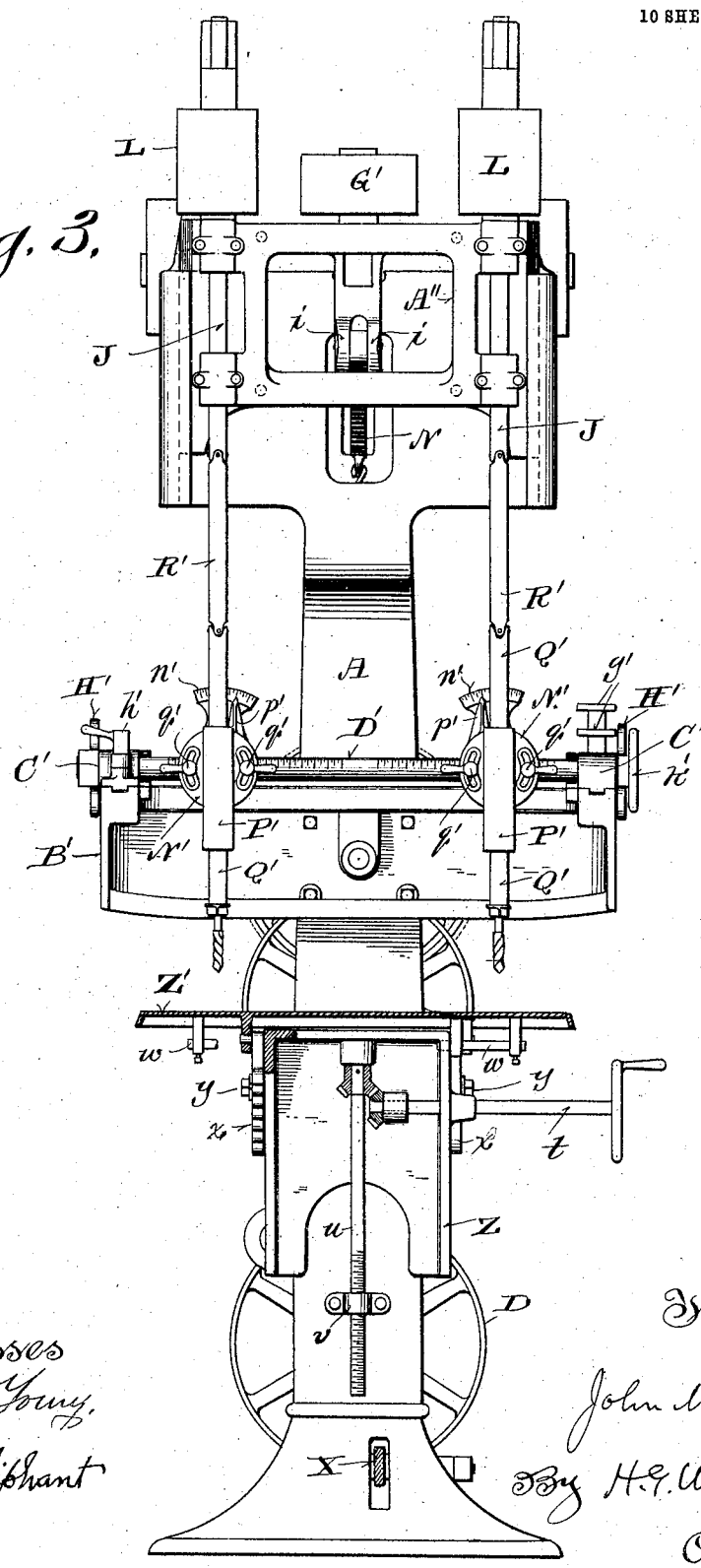

No. 780,573. PATENTED JAN. 24, 1905.
J. M. NASH.
WOODWORKING MACHINE.
APPLICATION FILED MAR. 9, 1903.
10 SHEETS—SHEET 4.
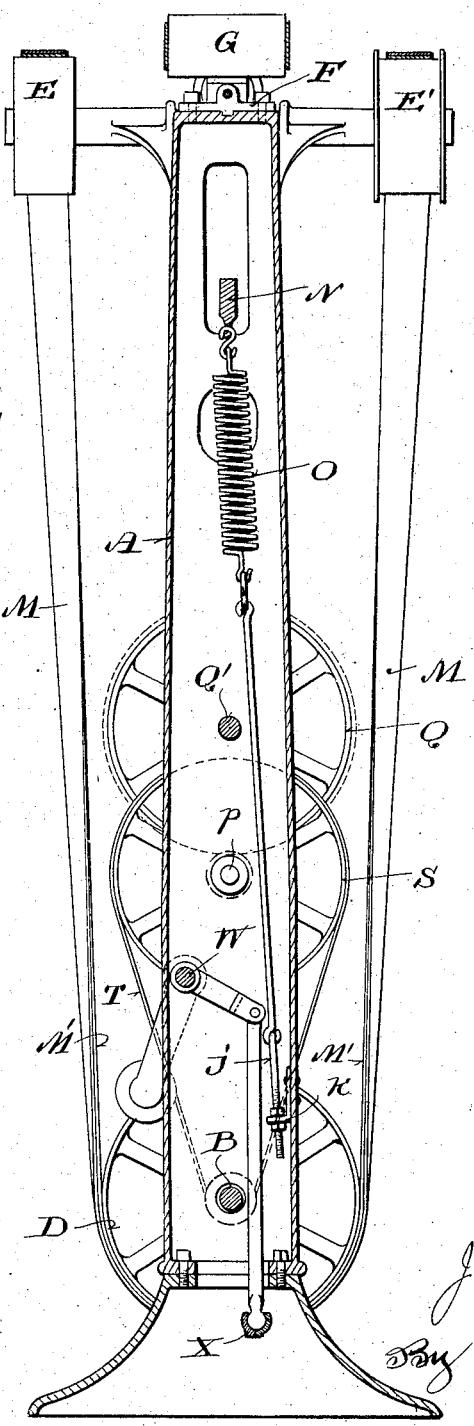
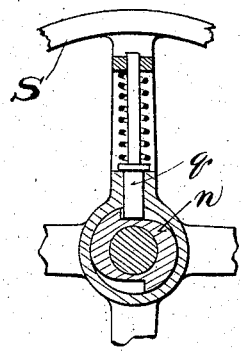

No. 780,573. PATENTED JAN. 24, 1905.
J. M. NASH.
WOODWORKING MACHINE.
APPLICATION FILED MAR. 9, 1903.
10 SHEETS—SHEET 5.

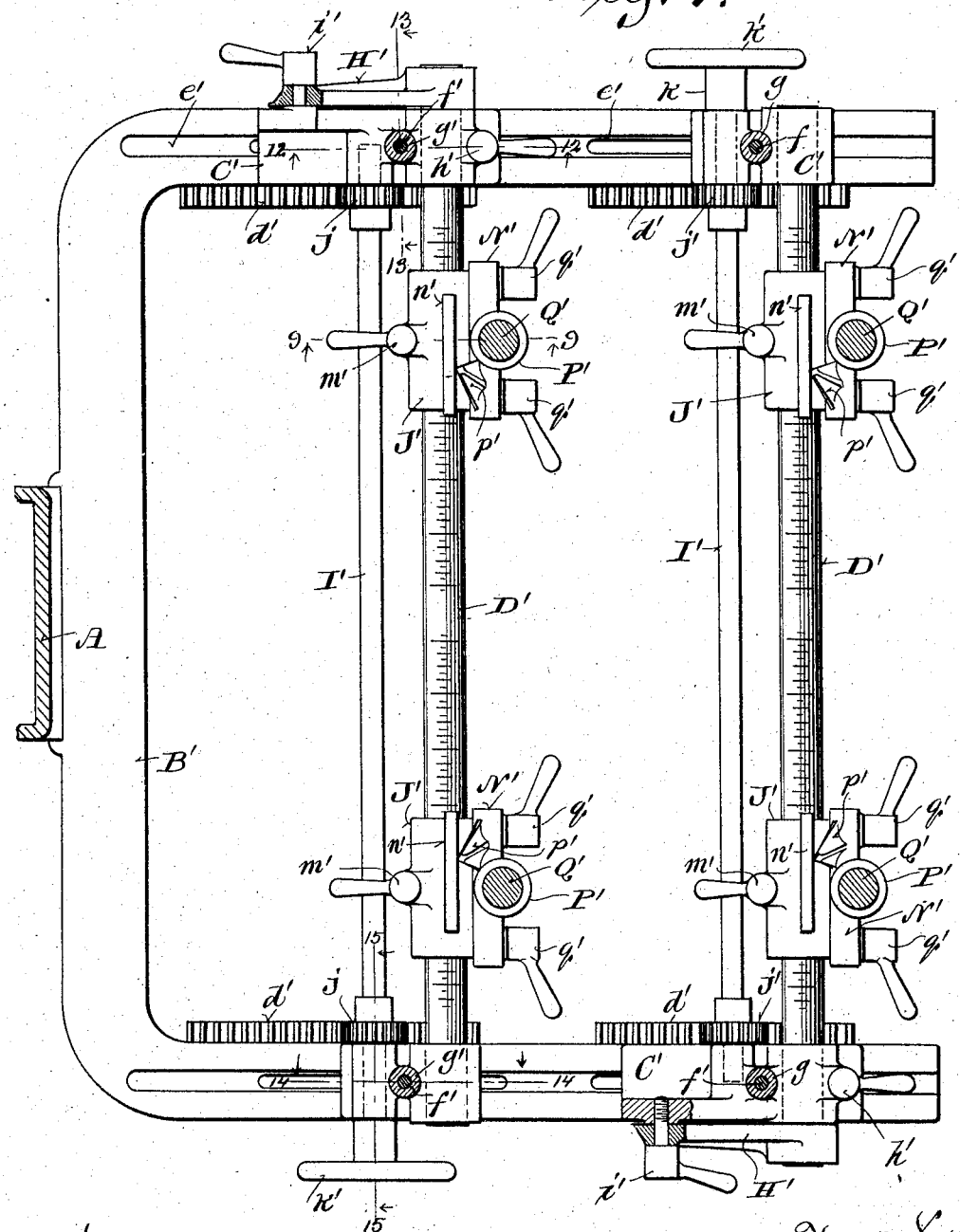

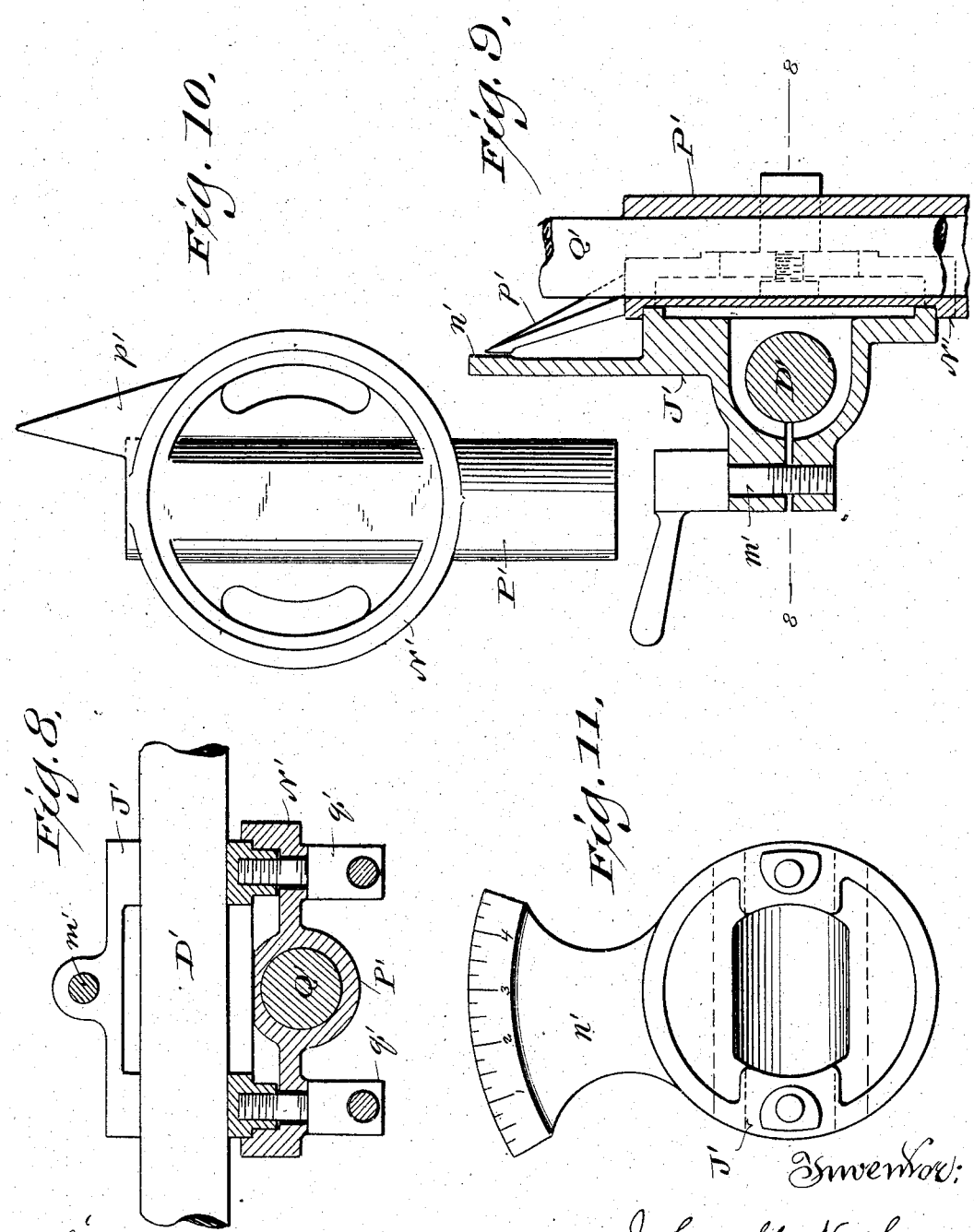

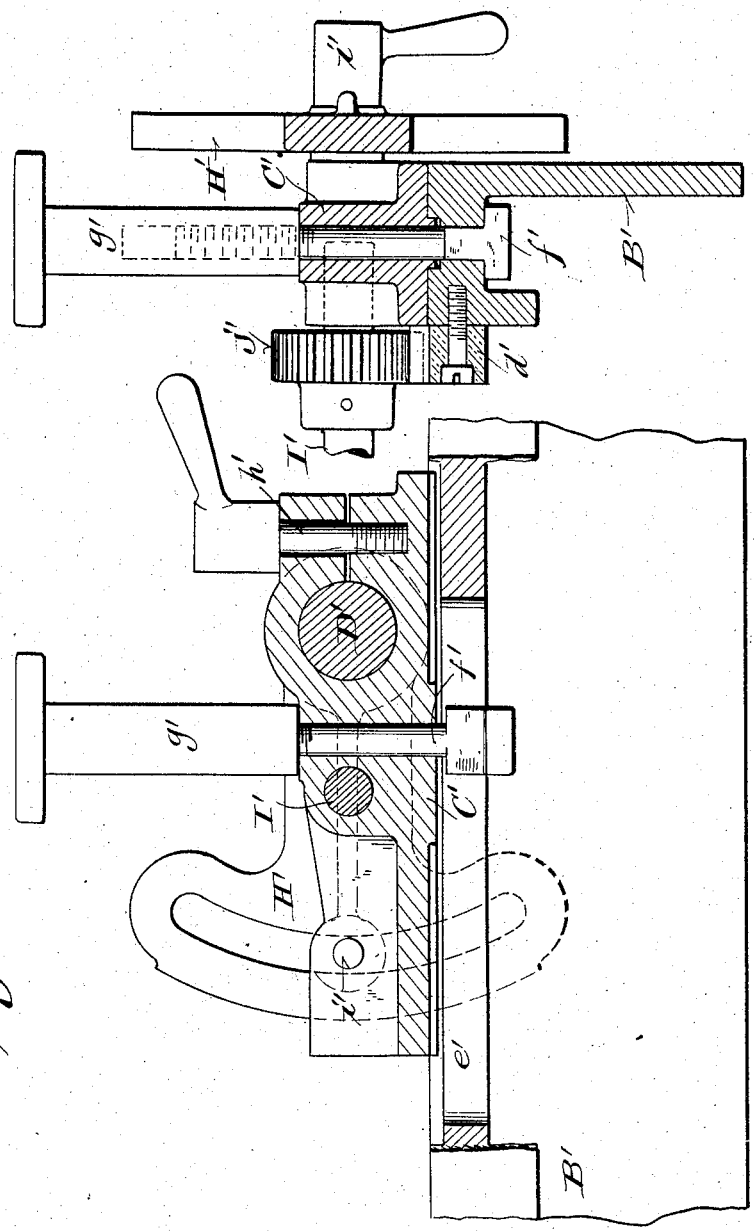

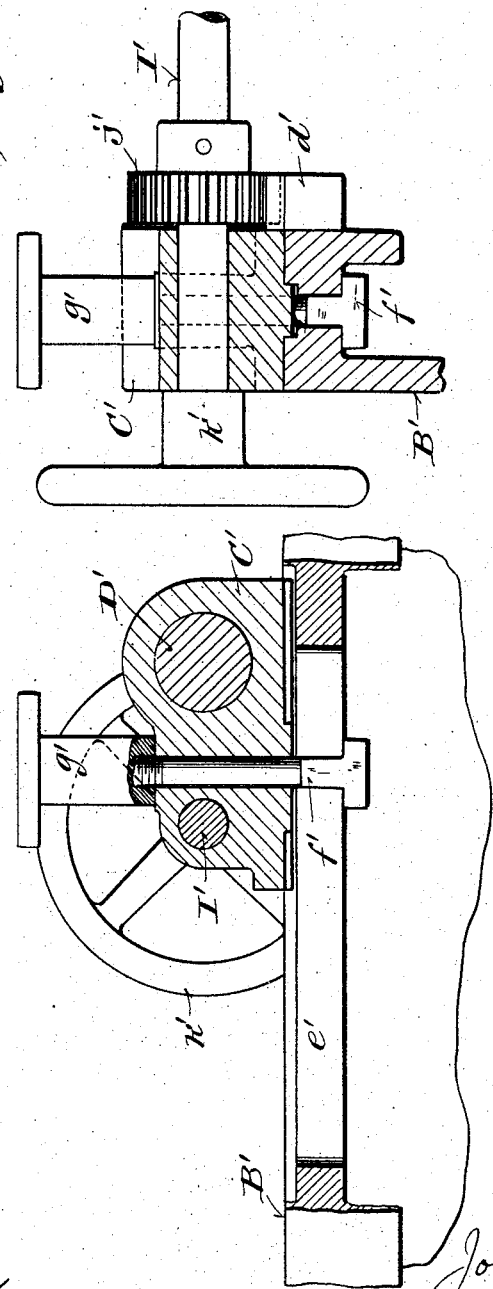

No. 780,573. PATENTED JAN. 24, 1905.
J. M. NASH.
WOODWORKING MACHINE.
APPLICATION FILED MAR. 9, 1903

10 SHEETS—SHEET 10.

Witnesses:
Geo. W. Young,
H. E. Oliphant

Inventor:
John M. Nash
By H. G. Underwood

No. 780,573. Patented January 24, 1905.

UNITED STATES PATENT OFFICE.

JOHN M. NASH, OF MILWAUKEE, WISCONSIN.

WOODWORKING-MACHINE.

SPECIFICATION forming part of Letters Patent No. 780,573, dated January 24, 1905.

Application filed March 9, 1903. Serial No. 146,818.

*To all whom it may concern:*

Be it known that I, JOHN M. NASH, a citizen of the United States, and a resident of Milwaukee, in the county of Milwaukee and State of Wisconsin, have invented certain new and useful Improvements in Woodworking-Machines; and I do hereby declare that the following is a full, clear, and exact description thereof.

The invention has for its object to provide a simple economical woodworking-machine similar in some respects to the one set forth in my Patent No. 658,670, of September 25, 1900, as organized for gang-boring at various angles; and it consists in certain peculiarities of construction and combination of parts hereinafter particularly described with reference to the accompanying drawings and subsequently claimed, the machine specified being one that may be charted when once set, to thereby facilitate its future resetting for the same variety of work.

Figure 1:
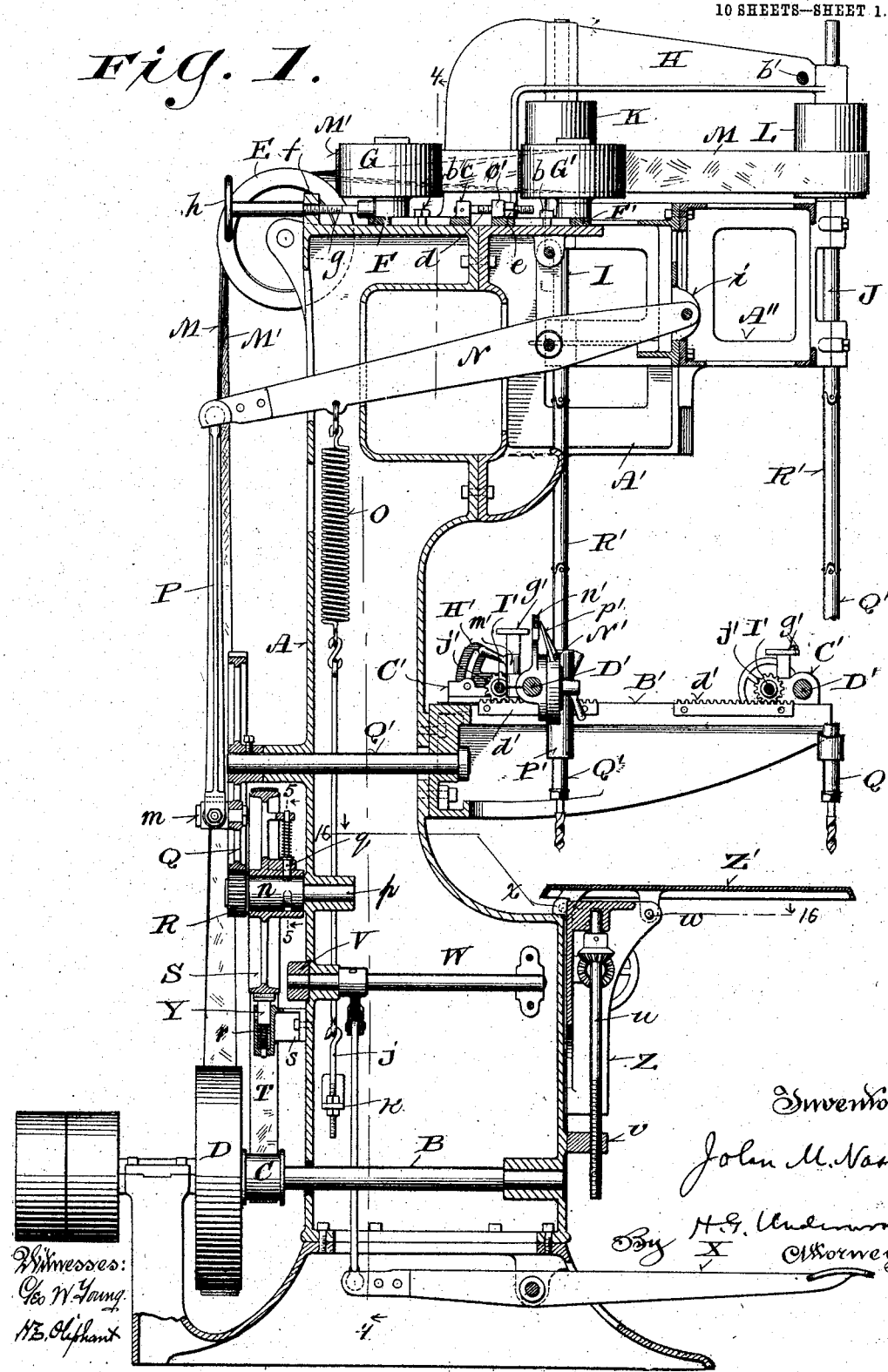
Figure 6:
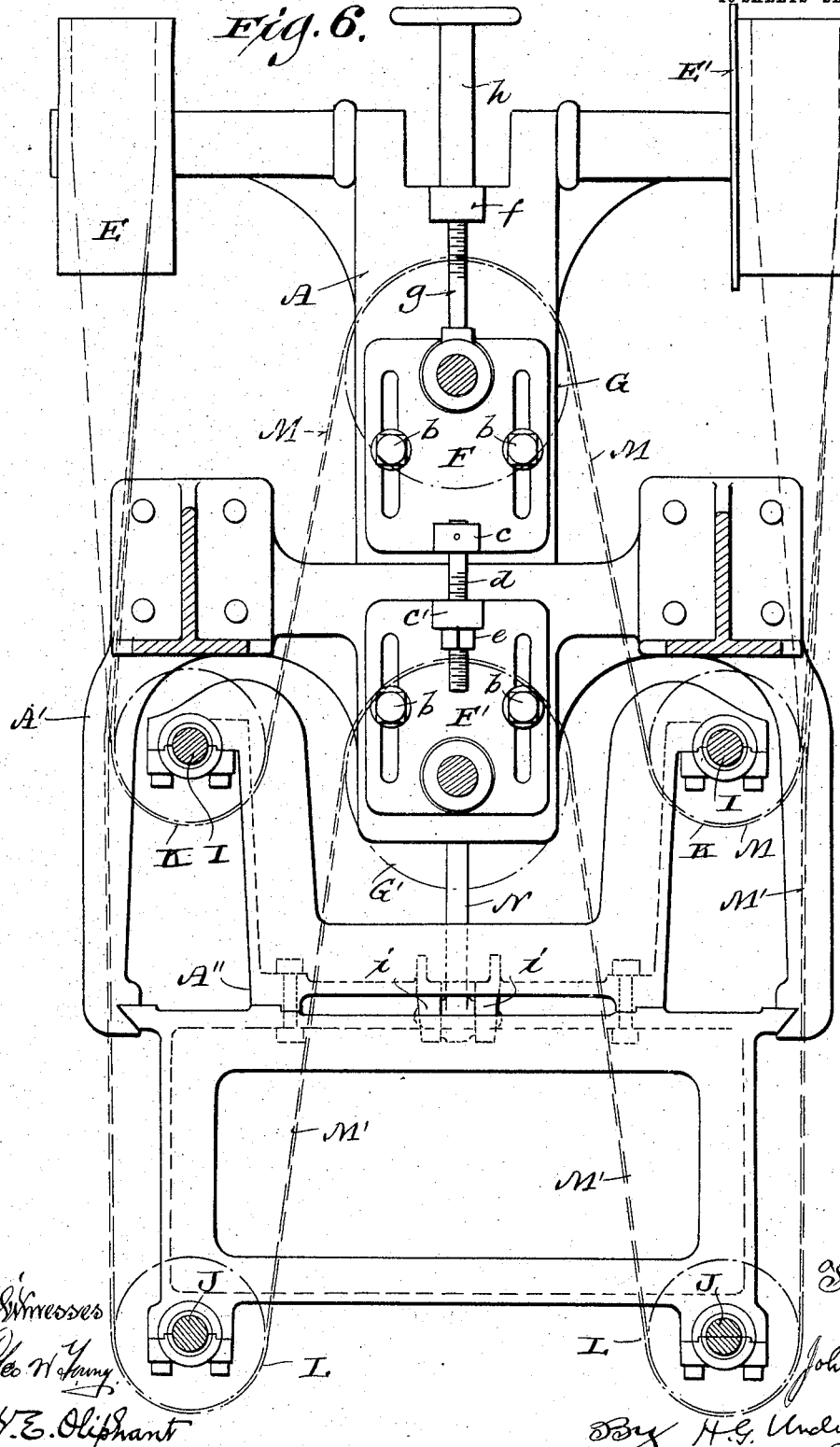
Figure 16:
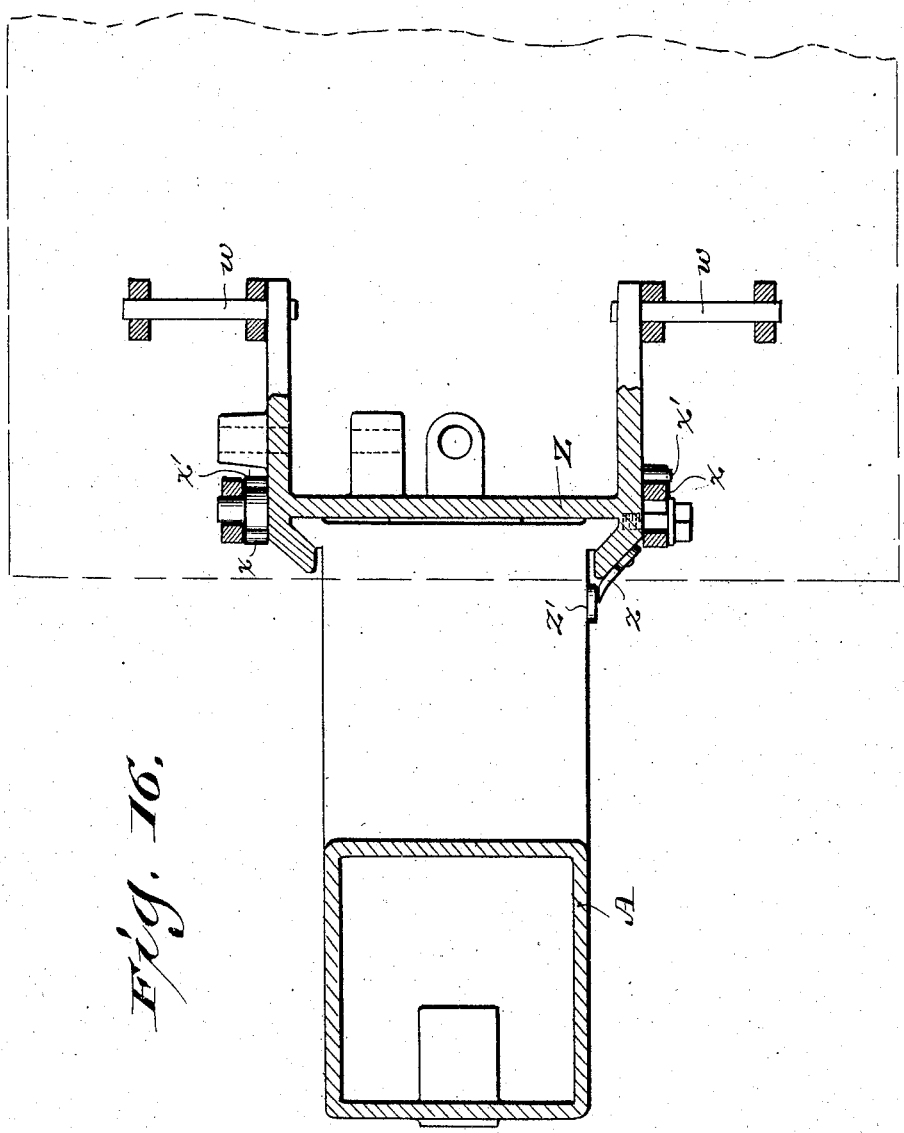

Figure 1 of the drawings represents a vertical central section of the machine; Fig. 2, a side elevation of the same; Fig. 3, a front elevation of said machine, partly in section; Figs. 4 and 5, sectional views respectively indicated by lines 4 4 and 5 5 in the first figure; Fig. 6, a plan view of the machine, partly in horizontal section; Fig. 7, a horizontal section indicated by line 7 7 in the second figure; Fig. 8, a partly-sectional detail view indicated by line 8 8 in the ninth figure; Fig. 9, a similar view indicated by line 9 9 in the seventh figure; Figs. 10 and 11, elevations of details in the machine; Figs. 12, 13, 14, and 15, detail sectional views respectively indicated by lines 12 12, 13 13, 14 14, and 15 15 in said seventh figure; and Fig. 16, a horizontal sectional view indicated by line 16 16 in the aforesaid first figure.

Referring by letter to the drawings, A indicates a hollow casting constituting the standard of the machine, the same being provided with bearings for a horizontal lower shaft B, upon which pulleys C D are made fast, and said shaft is also provided with fast and loose pulleys for a driving-belt. Supported in rear upper brackets of the machine-standard are the spindles of pulleys E E' and a partly-hollow casting A' bolted to the front upper portion of said standard constitutes an extension of the same. Surmounting said standard and the extension thereof are longitudinally-slotted plates F F', held in adjusted position by means of set-bolts $b$, that engage the slots. Fast in an ear $c$ of plate F is a screw $d$, that extends through an ear $c'$ of plate F' and engages a set-nut $e$, the plates thus coupled being independently adjustable. Extending rearward from plate F through an ear $f$ of the machine-standard is a screw $g$, and by means of a hand-nut $h$ on this screw, opposing said ear, the coupled plates may be simultaneously adjusted. These coupled plates are each provided with an upwardly-projecting stud, and idlers G G' are arranged to turn on the studs.

In dovetail vertically-sliding connection with the standard extension A' is a frame A'', that is preferably of two parts bolted together. This frame and a pair of overhanging arms H, bolted or otherwise rigid on the machine-standard, are provided with bearings for the spindles I J of pulleys K L, arranged in pairs transversely of the machine, and a front brace $b'$ joins the arms.

Trained on pulley D are two belts M M', one over the other, and these belts extend up over pulley E', from whence belt M is trained to run on a pulley K, the idler G, the other pulley K, and back over belt M' on pulley E' to the drive-pulley first aforesaid. The belt M' runs on a pulley L, the idler G', the other pulley L, and back under the outer belt M on pulley E' to the drive-pulley, the disposition of the several upper pulleys, the idlers, and stretchers of the belts being well illustrated by full and dotted lines in Fig. 6. From the foregoing it will be understood that the spindles I are run by one of the belts and the spindles J by the other of said belts from a pulley common to both, the tension of these belts being regulated by an adjustment of the plates F F', carrying the idlers aforesaid. Inasmuch as the frame A'' is vertically reciprocative by the means hereinafter specified, the pulleys K L movable with said frame are of sufficient width of face to prevent slipping of the belts trained thereon, and the spindles of said pulleys have longitudinal play in the arms H of the machine-standard.

In suspended link connection with the upper extension A' of the machine-standard is a lever N in pivotal connection with ears $i$ of frame A'', and a spiral spring O, suspended from the lever back of its fulcrum, is linked to a hook $j$, that has vertically-adjustable connection with a bracket $k$ on the machine-standard inside the same, adjustment of the hook serving to regulate tension of the spring. A pitman P, in ball-and-socket-joint connection with the end of the lever farthest from the fulcrum, is also in swivel connection with a wrist $m$ of a spur-wheel Q, fast on an arbor Q', that turn in bearings with which the machine-standard and a frame in rigid connection therewith are provided. The spur-wheel meshes with a pinion R, having an elongated hub $n$, loose on a stud $p$, extending from said standard, and loose on the pinion-hub is a pulley S, run by a belt T from the pulley C aforesaid. The tension of the belt is regulated by an opposing tightener-pulley U, loose on a crank V, suspended from an arbor W, arranged in bearings with which the aforesaid standard is provided, this arbor being in crank-and-link connection with a treadle X, sleeved on a pivot-rod supported by said standard. The hub of the pinion R is provided with diametrically opposite notches, and one or the other of these notches is engaged by a spring-controlled slip-latch $q$ for which the pulley S is provided with guides.

When the treadle is actuated, the pulley U bears against belt T to tighten same, and thereby cause rotation of pinion R with pulley S, whereby the spur-wheel Q is set in motion to give an upward throw to pitman P against resistance of spring O, and thus actuate the lever N to move the frame A'' and parts in connection therewith downward. The pitman having finished its upward stroke, the pull of the spring O will serve to continue the rotary movement of the spur-wheel Q should pressure be removed from the treadle, and thus the aforesaid frame and parts in connection therewith have automatic return to normal position, the movement being discontinued when said spring is fully contracted. However, if the treadle is held down the reciprocation of the frame A'' and parts therewith will be continuous, the means for reciprocating said frame being substantially the same as those set forth in the patent aforesaid for imparting like motion to a loose head.

To prevent overrunning of the frame-reciprocating mechanism when the treadle is released, a friction-plug Y, set on a contracted spiral spring $r$ in a bracket $s$, attached to the machine-standard, is arranged to impinge against the face of pulley S, as shown in Fig. 1.

Guided in connection with the lower front portion of the machine-standard is a vertical slide Z, provided with bearings for a horizontal hand-wheel spindle $t$, having bevel-gear connection with a vertical screw $u$, that is loose in the upper portion of said slide, the nut for this screw being a tapped lug $v$, projecting from said standard. Hence vertical adjustment of the aforesaid slide may be readily accomplished by manipulation of said spindle. Under side lugs of a work-table Z' are engaged by pivot-pins $w$ of the slide Z, and longitudinally-slotted links $x$, in pivotal suspension from said table, are engaged by set-bolts $y$ in connection with said slide. Hence said table is adjustable from horizontal to tilted position and may be securely held at the desired angle. The slide Z, table Z', and means by which the adjustment of said table is effected does not differ materially from what is shown and described in the patent above noted.

Herein the slide Z is shown as having a pointer $z$ opposite a scale $z'$, with which the machine-standard is provided, and thus various vertical adjustments of said slide may be arbitrarily determined and recorded for future reference. To provide for a record of the tilt adjustment of the work-table, one longitudinal edge of each link $x$ is notched at regular intervals and the notches indicated by numerals or other characters, some one of each series of notches being engaged by a lateral pin $x'$ of slide Z when said table is set at the desired angle.

Bolted to the front of the machine-standard above the work-table is the frame B', in which the arbor for the spur-wheel Q has one of its bearings, and this frame has forwardly-extending arms to which upwardly-projecting-racks $d'$ are made fast inside of said frame, the outside of each arm being provided with a scale, such as is shown in Fig. 2, by which to determine adjustments hereinafter explained. The forwardly-projecting arms of frame B' are provided with longitudinal slots $e'$, and these slots are engaged by bolts $f'$, that extend through carriages C' and also engage set-nuts $g'$, opposing said carriages. Each carriage is made to form a split holder for an end of a scaled rod D', and a clamp-screw $h'$ is employed to bind the holder on the rod, as is best shown in Fig. 12. Each of the scaled rods D' is provided at one end with a segmentally-slotted crank H', engaged by a clamp-screw $i'$, that also engages the adjacent carriage, and the slotted portion of the crank is provided with a scale, a mark on said carriage serving as a pointer for the scale, as is shown in Fig. 2.

Parallel to each scale-rod D' is an arbor I', that has its bearings in opposite carriages and is provided with pinions $j'$, engaging racks $d'$ of the frame B', said arbor being also provided with a hand-wheel $k'$, by which it is turned to adjust said carriages in a direction to or from the machine-standard, this adjustment being indicated by a scale with which one or the other of the aforesaid frame-arms is provided.

Arranged on each scale-rod D' are split slides J', and clamp-bolts $m'$ are employed in connection with the slides to hold them in adjusted position on said rods, each slide being independently adjustable. Constituting part of each slide is a segmental scale-arm $n'$, opposed by a pointer extension $p'$ of a segmentally-slotted plate N', combined with a sleeve P', the two being in one piece or otherwise rigidly connected, and the slots of said plates are engaged by clamp-screws $q'$, that also engage said slide.

Guided in each of the sleeves P' is the stock Q' for a boring-bit, and this stock is in universal-joint connection with a coupling R', having like connection with a spindle I or J, the universal joints herein shown being similar to the one on which my Patent No. 599,189 was granted February 15, 1898.

Adjustment of the carriages C' regulates the distance desirable between scale-rods D, on which the slides J' are independently adjustable longitudinally of the same. Rotary adjustment of each scale-rod with slides clamped thereon place the bit-stock guide-sleeves P' with said slides at a desirable angle, and said sleeves being of themselves independently adjustable with their backing-plates N' each of them may be set at various angles on its adjacent slide. As all of these adjustments are determinable by scale, they may be made a matter of record for future reference. Provision being had for charting the machine when once set for any kind of work of which it is capable, it may at a future time be readily reset from the chart for the same kind of work without measuring.

In matters of detail the machine is susceptible of some variations without departure from the scope of my invention.

Having thus described my invention, what I claim as new, and desire to secure by Letters Patent, is—

1. A woodworking-machine comprising reciprocative rotary bit-stock spindles, a vertically-adjustable slide, a work-table in pivotal connection with the slide, longitudinally-slotted links in pivotal suspension from the table and each provided with a series of edge notches parallel to the slot therein, pins projecting from said slide in engagement with link-notches, and set-bolts engaging the link-slots and the aforesaid slide.

2. A woodworking-machine comprising reciprocative rotary bit-stock spindles, a vertically-adjustable slide provided with a pointer, a scale arranged to be traversed by the pointer, a work-table in pivotal connection with the slide, longitudinally-slotted links in pivotal suspension from the table and provided with arbitrarily-indicated edge notches, pins arranged in connection with said slide to engage link-notches, and set-bolts engaging the link-slots and the aforesaid slide.

3. A woodworking-machine comprising rotary spindles, a stationary frame, carriages adjustable on the frame, a rod in rotary adjustable connection with the carriages, slides adjustable longitudinally of the rods, guides in rotatory adjustable connection with the slides, and bit-stocks that being flexibly coupled to the spindles are loose in said guides.

4. A woodworking-machine comprising reciprocative rotary spindles, a stationary frame, carriages guided on the frame, means for adjusting the carriages, rods in rotatory adjustable connection with said carriages, slides adjustable longitudinally of the rods, guides in rotatory adjustable connection with the slides, means for maintaining the various adjustments, other means for arbitrarily indicating said adjustments, and bit-stocks that being flexibly coupled to the spindles are loose in said guides.

5. A woodworking-machine comprising reciprocative rotary spindles, a stationary frame having arms thereof provided with racks, carriages on the rack-arms of the frame, carriage-supported arbors provided with rack-engaging pinions, means for holding the carriages in adjusted position, scaled rods for which said carriages are provided with clamps, a segmentally-slotted and scaled crank fast to each rod, a clamp-screw engaging the crank-slot and adjacent carriage, slides in clamp connection with said rods and each provided with a segmental scale-arm, guide-sleeves rigid with plates in rotatory adjustable connection with the slides, scale-arm pointers with the guides and plates, bit-stocks loose in the guides, and couplings in flexible connection with said spindles and bit-stocks.

6. A woodworking-machine comprising reciprocative rotary spindles, a stationary frame having arms thereof provided with racks, carriages on the rack-arms of the frame, carriage-supported arbors provided with rack-engaging pinions, means for holding the carriages in adjusted position, rods for which said carriages are provided with clamps, a segmentally-slotted crank fast to each rod, a clamp-screw engaging the crank-slot and adjacent carriage, slides in clamp connection with said rods, guide-sleeves rigid with plates in rotatory adjustable connection with the slides, bit-stocks loose in the sleeves and couplings in flexible connection with said spindles and bit-stocks.

7. A woodworking-machine comprising vertically-reciprocative spindles, a pair of belts trained on a main pulley and other suitably-arranged pulleys to each drive a separate set of spindles, idlers that are each arranged to constitute a tightener for one or the other of the belts and which have supports arranged and connected to be adjusted separately or together, universally-adjustable guides, bit-stocks loose in the guides, and couplings in flexible connection with said spindles and bit-stocks.

8. A woodworking-machine comprising a reciprocative rotary bit-stock spindle, a vertically-adjustable slide provided with a pointer, a scale arranged to be traversed by the pointer, a work-table in pivotal connection with the slide, longitudinally-slotted and notched edge links in pivotal suspension from the table, pins arranged in connection with said slide to engage link-notches, and set-bolts engaging the link-slots and the aforesaid slide.

9. A woodworking-machine comprising a reciprocative rotary spindle, a stationary frame, a carriage guided on the frame, means for adjusting the carriage, a rod in rotatory adjustable connection with said carriage, a slide adjustable longitudinally of the rod, a guide in rotatory adjustable connection with the slide, means for maintaining the various adjustments, other means for arbitrarily indicating said adjustments, and a bit-stock that being flexibly coupled to the spindle is loose in said guide.

10. A woodworking-machine comprising reciprocative rotary spindles, a stationary frame having arms thereof provided with racks, a carriage on the rack-arms of the frame, a carriage-supported arbor provided with rack-engaging pinions, means for holding the carriage in adjusted position, a scaled rod for which the carriage is provided with clamps, a segmentally-slotted and scaled crank fast to the rod, a clamp-screw engaging the crank-slot and said carriage, a slide in clamp connection with the rod and provided with a segmental scale-arm, a guide-sleeve rigid with a plate in rotatory adjustable connection with the slide, a scale-arm pointer with the guide and plate, a bit-stock loose in the guide, and a coupling in flexible connection with said spindle and bit-stock.

In testimony that I claim the foregoing I have hereunto set my hand, at Milwaukee, in the county of Milwaukee and State of Wisconsin, in the presence of two witnesses.

JOHN M. NASH.

Witnesses:
N. E. OLIPHANT,
JOHN HOTH.